United States Patent
Morhart et al.

(10) Patent No.: US 10,615,830 B2
(45) Date of Patent: Apr. 7, 2020

(54) METHOD FOR DETECTING A DSRC SIGNAL IN A MOTOR VEHICLE

(71) Applicant: Continental Automotive GmbH, Hannover (DE)

(72) Inventors: Christian Morhart, Koefering (DE); Thomas Georgi, Regensburg (DE); Andre Merten, Pentling (DE); Christian Kursawe, Straubing (DE); Christian Fruth, Parsburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/576,148

(22) PCT Filed: May 18, 2016

(86) PCT No.: PCT/EP2016/061160
§ 371 (c)(1),
(2) Date: Nov. 21, 2017

(87) PCT Pub. No.: WO2016/188824
PCT Pub. Date: Dec. 1, 2016

(65) Prior Publication Data
US 2018/0198477 A1    Jul. 12, 2018

(30) Foreign Application Priority Data
May 22, 2015   (DE) .......................... 10 2015 209 463

(51) Int. Cl.
*H03D 1/24*       (2006.01)
*H04B 1/30*       (2006.01)
(Continued)

(52) U.S. Cl.
CPC ............... *H04B 1/30* (2013.01); *H04B 1/082* (2013.01); *H04L 27/06* (2013.01); *H04L 67/12* (2013.01);
(Continued)

(58) Field of Classification Search
CPC ........... H04B 1/30; H04B 1/082; H04W 4/80; H04W 4/40; H04L 27/06
(Continued)

(56) References Cited

U.S. PATENT DOCUMENTS 9,949,059 B1 *   4/2018   Bradley ................ H04W 4/001
2004/0212517 A1 *  10/2004  Inoue ............... G08G 1/096716
340/905

(Continued)

FOREIGN PATENT DOCUMENTS

DE   102008009330 A1   6/2009
DE   102009045748 A1   4/2011

OTHER PUBLICATIONS

International Search Report and Written Opinion dated Jul. 29, 2016 of corresponding International patent application PCT/EP2016/061160.
(Continued)

*Primary Examiner* — Helene E Tayong

(57) ABSTRACT

The application relates to a device and to a method for detecting a Dedicated Short Range Communication (DSRC) signal in a motor vehicle, in particular having a module with a "C2X" communication system and/or "Car2Car" communication system of a motor vehicle, wherein after amplitude demodulation of a received signal, one or more properties of the received signal are examined by a protocol detector.

7 Claims, 5 Drawing Sheets

(51) Int. Cl.
　　*H04W 4/40* (2018.01)
　　*H04B 1/08* (2006.01)
　　*H04L 27/06* (2006.01)
　　*H04W 4/80* (2018.01)
　　*H04L 29/06* (2006.01)
　　*H04L 29/08* (2006.01)

(52) U.S. Cl.
　　CPC ............... *H04L 69/22* (2013.01); *H04W 4/40* (2018.02); *H04W 4/80* (2018.02)

(58) Field of Classification Search
　　USPC ........................................................ 375/320
　　See application file for complete search history.

(56) References Cited

U.S. PATENT DOCUMENTS

| | | | |
|---|---|---|---|
| 2006/0109085 A1 | 5/2006 | Tiernay et al. | |
| 2008/0205568 A1* | 8/2008 | Oyama | H04B 7/2643 375/365 |
| 2010/0052943 A1* | 3/2010 | Bos | G07B 15/063 340/901 |
| 2010/0284384 A1 | 11/2010 | Staehlin et al. | |
| 2011/0034201 A1* | 2/2011 | Hamada | H04L 67/12 455/517 |
| 2013/0065530 A1* | 3/2013 | Gansen | H04L 12/66 455/41.2 |
| 2014/0247838 A1 | 9/2014 | Seok et al. | |
| 2014/0378054 A1* | 12/2014 | Wang | H04B 7/26 455/41.2 |

OTHER PUBLICATIONS

Office Action dated May 2, 2016 of corresponding German patent application No. 10 2015 209 463.4.
English Abstract of DE 102009045748 A1.
Dieter Smely "World Class Standards CEN DSRC/ITS G5 CEN DSRC/ITS-G5 coexistence Basic RF properties"; Jul. 1, 2011; XP055579964; URL:https://docbox.etsi.org/workshop/2011_ITSG5_DSRC/05-Smely_JRC_Plugtest_Coexistence_of_CEN_DSRC_and_ITS-G5_V00.pdf; retrieved from the internet on Apr. 10, 2019.

* cited by examiner

METHOD FOR DETECTING A DSRC SIGNAL IN A MOTOR VEHICLE

The invention relates to a method and to devices for detecting a DSRC signal in a motor vehicle.

Several approaches, for instance the approach taken in DE 10 2008 009 330 A1, already exist per se for "Car2Car" communication (communication between vehicles) and "C2X" communication (communication between a vehicle and other vehicles and/or e.g. infrastructure such as beacons, telecommunications network, toll stations etc.).

An object of the invention is to optimize "C2X" communication and/or "Car2Car" communication. The object is achieved by the subject matter of each of the independent claims. The dependent claims and the description define some particularly advantageous embodiments of the invention.

Embodiments of the invention can facilitate in particular nodes of "C2X" communication and/or "Car2Car" communication, e.g. in one or more motor vehicles, in particular to detect DSRC communication efficiently (if applicable of any sort).

Further features and advantages of some advantageous embodiments of the invention appear in the following description of exemplary embodiments of the invention with reference to the drawing, in which, in each case in simplified and schematic form for the purpose of illustrating some possible embodiments of the invention:

FIG. 5 shows what is known as "Car2Car" communication (vehicle-to-vehicle communication or communication between vehicles), which is also shown in part in DE102008009330A1, in which communication between vehicles and communication between vehicles and infrastructure (such as beacons and/or mobile communications networks and/or satellites) is presented.

FIG. 5 shows what is known as "C2X" communication (communication of a vehicle with other vehicles and/or e.g. infrastructure such as beacons, telecommunications network, toll stations, etc.), and also for example "Car2Car" communication (communication between two vehicles 201, 202), which is again similar in part to that shown in DE 10 2008 009 330 A1.

Figure 5:
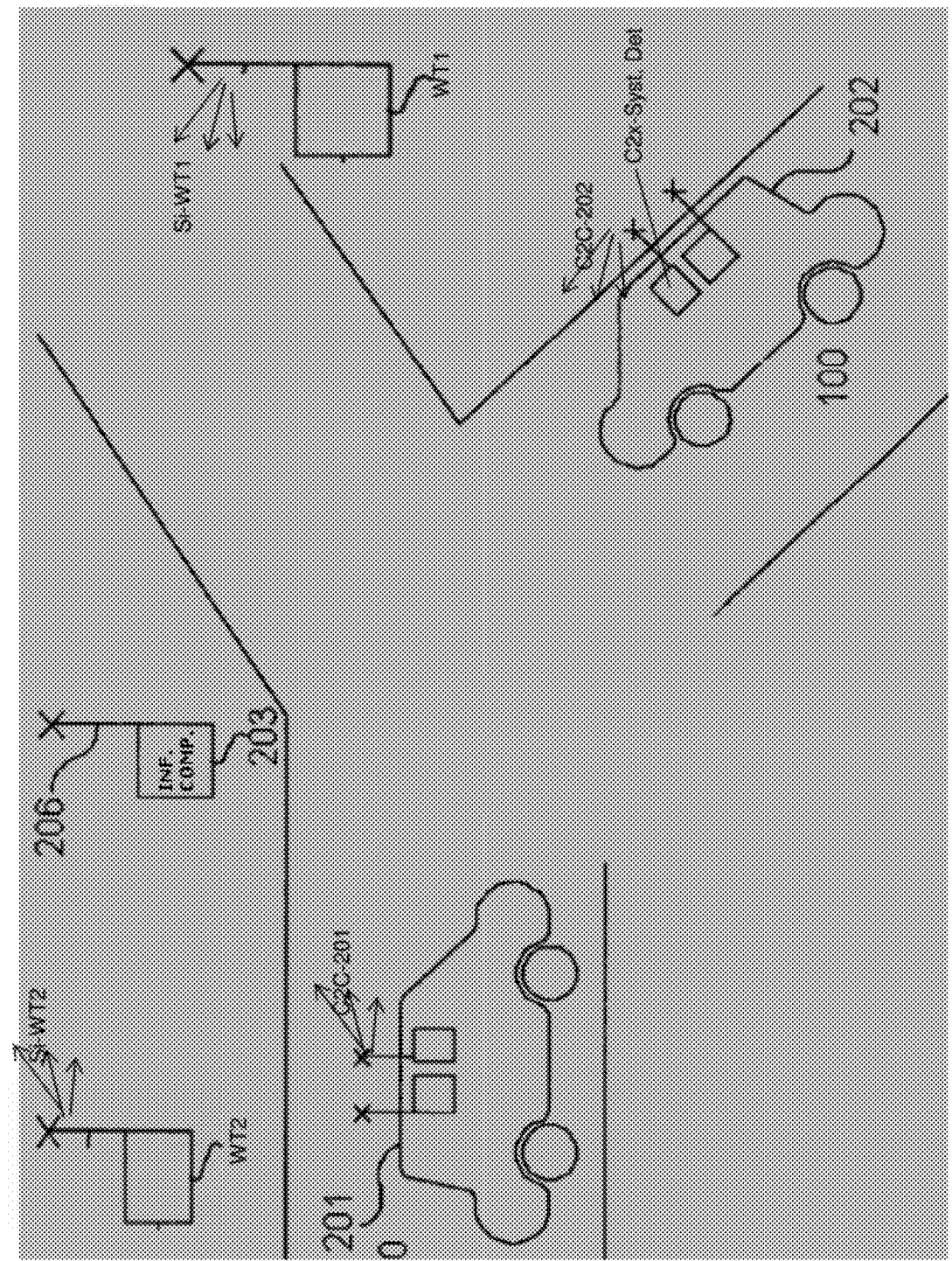
FIG. 5 shows "C2X" and/or "Car2Car" communication.

In FIG. 5, communication C2C-201, C2C-202 takes place e.g. between two or more vehicles 201, 202 and/or between at least one vehicle 201 and an infrastructure component such as e.g. a beacon guidance system and/or toll system 203, and, to be precise, takes place e.g. directly therebetween by radio e.g. using signals C2C-201, C2C-202 indicated in FIG. 5.

Communication C2C-201, C2C-202 e.g. between two or more vehicles 201, 202 and/or between at least one vehicle 201 and an infrastructure component such as e.g. a beacon guidance system and/or toll system 203 or other system can take place e.g. directly therebetween (in other words e.g. no mobile communications network etc. is interposed in the transmission between the two vehicles 201, 202 or between a vehicle and infrastructure 203) e.g. in a frequency band of 5.8 to 5.9 GHz.

In a frequency band intended for "C2X" communication and/or "Car2Car" communication, a "DSRC" communication (=e.g. "Dedicated Short Range Communication") can also take place from any additional nodes e.g. in accordance with EN 12253, EN 13372, EN 12834, EN 12795 for CEN DSRC (or UNI DSRC), where e.g. AM (amplitude modulation) can be used in what is known as the downlink (communication or data transmission to a node).

For "C2X" and/or "Car2Car" communication nodes 201, 202 and/or 201, 203 it would actually be possible e.g. to detect "DSRC" communication (=e.g. "Dedicated Short Range Communication") using signals Si-WT1 and/or Si-WT2 from any additional nodes WT1, WT2 using e.g. a simple diode envelope detector, although this might be prone to interference with other systems using amplitude modulation in a similar frequency band such as e.g. that of the nodes of "C2X" communication and/or "Car2Car" communication, which the additional nodes wish to detect.

For this situation, regulatory authorities provide various techniques for coexistence, e.g. ETSI TS 102 792; these techniques may be based e.g. on a "detect and avoid" principle, where different techniques can be used for a C2X and/or C2C system and for a DSRC RSU so that both can coexist.

For instance, detection of "DSRC" communication (=e.g. "Dedicated Short Range Communication") from "C2X" and/or "Car2Car" communication nodes 201, 202 and/or 201, 203 and/or of other signals Si-WT1 and/or Si-WT2 from any additional nodes WT1, WT2 (e.g. in, or adjacent to, the frequency band for "C2X" communication and/or "Car2Car" communication from "C2X" and/or "Car2Car" nodes 201, 202 and/or 201, 203) might be possible using a CEN DSRC OBU communication unit as the signal detector e.g. in combination with a C2C transceiver unit, e.g. based on ASIC components.

There are various possible ways of detecting the existence of "DSRC" communication using signals Si-WT1 and/or Si-WT2 from (any additional) nodes WT1, WT2 such as e.g. a CEN DSRC signal at 5.8 GHz. The simplest might be a simple power detector, which, however, is inevitably not optimal because of a lack of frequency selectivity and the possible existence of additional communication systems in this frequency band or in an adjacent frequency band such as WLAN.

FIG. 1, FIG. 2, FIG. 3 and FIG. 4 illustrate some embodiments of the invention which e.g. as alternative approaches can facilitate efficient detection of (at least) one DSRC signal from additional nodes.

The embodiments of the invention shown can e.g. detect some properties of a received signal (in particular a DSRC signal) to establish whether specifically a DSRC signal is present.

Figure 1:
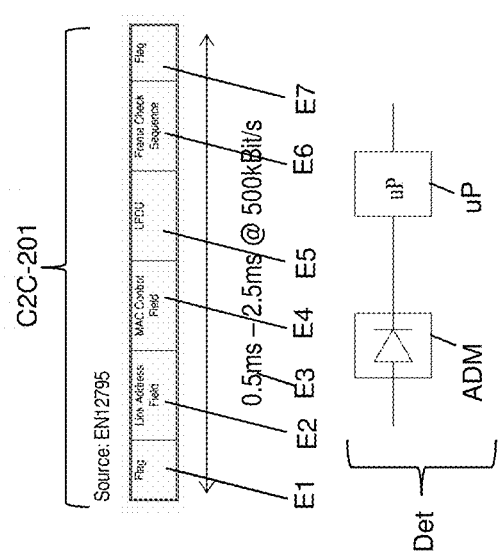
FIG. 1 shows by way of example a DSRC signal to be detected having some properties that can be detected e.g. by a microcontroller, and underneath a (DSRC) detector comprising an amplitude demodulator and a microcontroller.

Such properties may be e.g. some or a plurality of the (DSRC-signal) properties of a DSRC signal to be detected, which properties are specified in the standard EN12795 (which can be found on the Internet, for example) and/or are given in FIG. 1.

Figure 2:
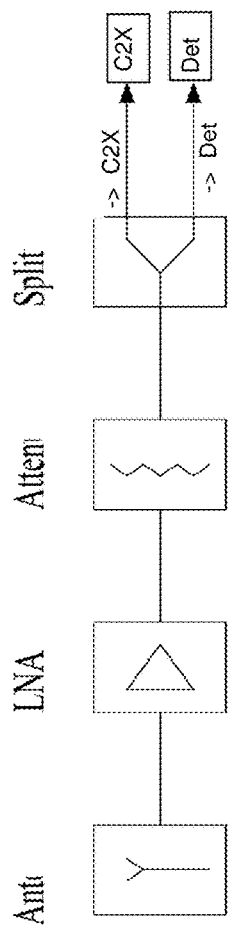
FIG. 2 shows a module comprising receiving elements and a splitter to a "C2X" and/or "Car2Car" module part and to a detector of the module.
Figure 3:
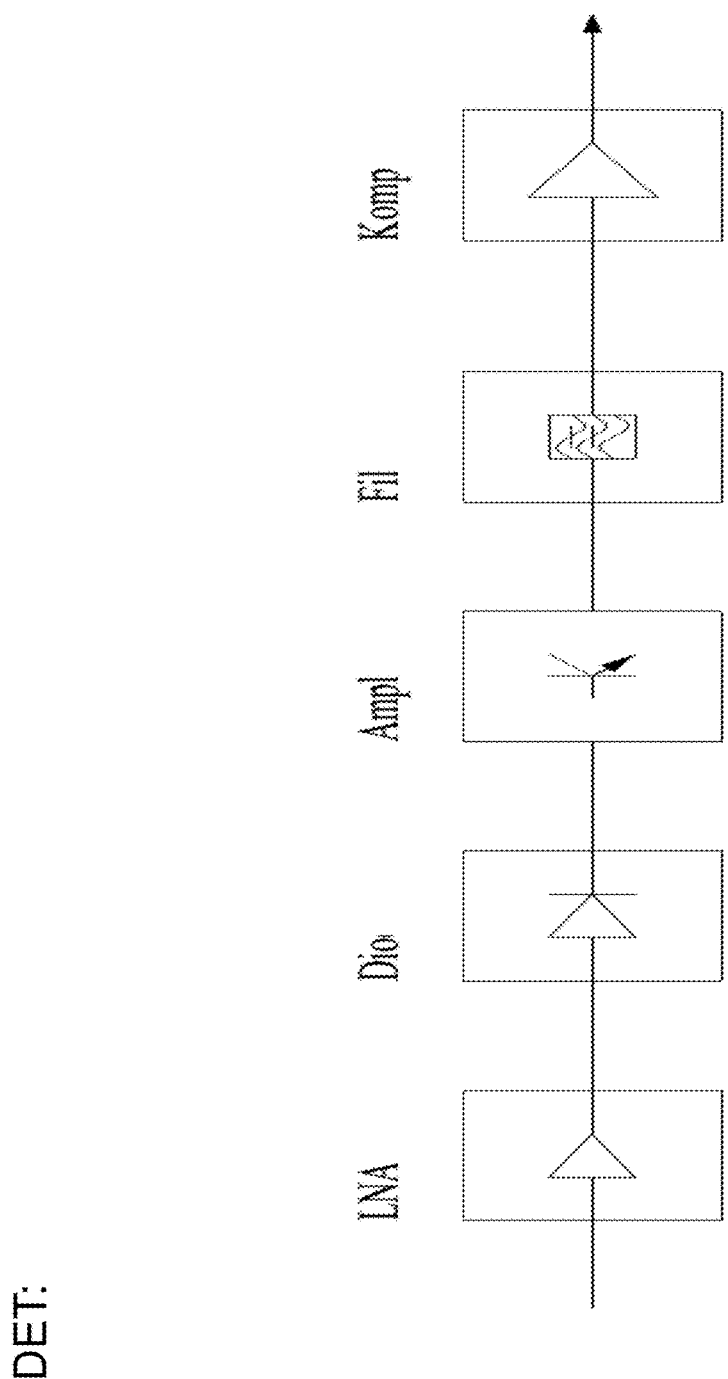
FIG. 3 shows elements of a detector (e.g. of a module comprising a "C2X" and/or "Car2Car" module part)

The top of FIG. 1 shows by way of example a signal (C2C-201) and some properties E1-E7 of a DSRC signal to be detected (such as e.g. Si-WT1), each of which can be examined and, if applicable, detected by a DSRC detector DET shown at the bottom of FIG. 1 (in particular by an amplitude demodulator ADM and e.g. by a protocol detector uP connected thereafter as an evaluator, in particular in the form of a microcontroller), e.g. by arrangements such as in FIG. 2 and/or in FIG. 3.

Said detectable properties E1-E7 etc. may be in particular, for instance:

- what is known as the preamble E1 (=e.g. the initial part of a signal C2C-201, C2C-202 from a C2X/C2C node 201, 202 or of a DSRC signal Si-WT1, Si-WT2 from an additional node);
- and/or the frame length (=e.g. the frame length of a signal C2C-201, C2C-202 from a C2X/C2C node 201, 202 or of a DSRC signal Si-WT1, Si-WT2 from an additional node);
- and/or one or more start flag(s) E1 (=e.g. a bit sequence at the start of a signal C2C-201, C2C-202 from a C2X/C2C node 201, 202 or at the start of a DSRC signal Si-WT1, Si-WT2 from an additional node);
- and/or one or more end flag(s) E7 (e.g. a bit sequence at the end of a DSRC signal C2C-201, C2C-202 from a C2X/C2C node 201, 202 or at the end of a signal Si-WT1, Si-WT2 from an additional node);
- and/or a frame check sequence E6 (=e.g. a checksum of a DSRC signal C2C-201, C2C-202 from a C2X/C2C node 201, 202 or of a signal Si-WT1, Si-WT2 from an additional node);
- and/or the (average) data rate E3 of a received signal (such as e.g. C2C-201) and/or of a DSRC frame, which can be compared with a nominal data rate of e.g. 500 kbps;
- and/or other properties of a DSRC frame; which properties (E1-E7 etc.) of a received (ANT) signal (such as e.g. C2C-201, Si-WT1) can be detected individually or in any combination (of a plurality of properties).

In this process, e.g. if (e.g. based on a definition in the detector) one or two or more than two of said properties (E1-E7 etc.) of a received (ANT) signal (such as e.g. C2C-201, Si-WT1) are detected, it could be decided that it is e.g. a DSRC signal Si-WT1, and if none or less than an e.g. defined number of said properties (E1-E7 etc.) of a received (ANT) signal (such as e.g. C2C-201, Si-WT1) are detected, it could be decided that C2C-201 e.g. is not a DSRC signal.

An advantageous embodiment can consist in integrating a detector (detecting the properties such as e.g. those shown at the top of FIG. 1) in particular into a C2C system (e.g. instead of a separate module) in e.g. a motor vehicle 201, 202 using infrastructure that is provided anyway in a motor vehicle 201, 202 for the C2C/C2X communication.

An embodiment according to the invention of a detection device can use e.g. an antenna and/or LNA of a C2C device in a motor vehicle 201, 202 and/or use the same frequency band and/or use for DSRC detection of signals Si-WT1, Si-WT2 from additional nodes WT1, WT2 and/or for increasing the sensitivity. An LNA (e.g. a low noise amplifier or amplifier) may be provided anyway in a C2C and/or C2X system C2X-Syst in a motor vehicle 201, 202 in order e.g. to reduce the impact of attenuations and/or to improve the noise figures of the system.

DSRC detection of e.g. signals Si-WT1, Si-WT2 from additional nodes WT1, WT2 can take place e.g. after C2X communication of a C2X system C2X-Syst of a motor vehicle 201 (e.g. in the same module C2X-Syst). An additional splitter can be provided to separate an (input) signal (for instance from signals Si-WT1, Si-WT2 from additional nodes WT1, WT2).

FIG. 2 and FIG. 3 each show embodiments according to the invention of a DSRC detector, in particular partially integrated with a C2X/C2C module C2X-Syst for a motor vehicle 202.

A C2X system C2X-Syst of a motor vehicle 201 can comprise, e.g. as shown in FIG. 2, for reception in particular an antenna Ant, in particular an antenna Ant that also sends and/or receives signals for a C2X/C2C communications module in a motor vehicle 202, and an amplifier LNA, in particular an amplifier LNA that also amplifies (e.g. received) signals for a C2X/C2C communications module in a motor vehicle 202, and an attenuator Atten, in particular an attenuator that also processes (e.g. received) signals for a C2X/C2C communications module in a motor vehicle 202, and a splitter Split, which can guide signals (e.g. Si-WT1, and/or C2C-201) received by the antenna Ant to a C2X/C2C communications module in a motor vehicle 202 and to a detector Det in the motor vehicle 202, which detector (Det) detects signals for instance with regard to the properties e.g. illustrated in FIG. 1.

FIG. 3 shows a (DSRC-signal) detector DET (e.g. such as at the bottom of FIG. 1 and/or in FIG. 2), which can be connected in series after an amplitude demodulator ADM of a detector DSRC-DECT.

A detection module DET for DSRC signals in this case comprises an optional amplifier LNA, a diode Dio (as an AM detector e.g. one diode), an (IF) amplifier, an (IF) filter Fil and an (optional) comparator Komp. When a comparator Komp is used, the detector can also work without using an ADC integrated in the microcontroller.

Integrated ADCs in typical standard microcontrollers can rarely achieve a sampling rate in the Megabit per second range; this is why alternative solutions may be used for data acquisition.

Two fundamental methods are proposed in particular: one such embodiment of the invention, in which data acquisition uses standard timer input capture sampling, and a second embodiment of the invention, in which the signal is oversampled using a microcontroller SPI unit.

One advantage of the first approach can be very precise detection of the data rate with averaging of multiple successive samples. This can limit the impact of jitter on individual samples. One disadvantage of this method can lie in a higher processing time for decoding Manchester-coded bits.

The second approach can have the advantage of simpler data decoding because the amplitude-modulated signal can be converted directly into data bits. The sampling frequency or sampling rate can be controlled by an SPI clock frequency. One disadvantage of this approach can be less precise data rate exclusion, because the detection of sampling violations (i.e. whether or not the data rate matches the sampling frequency) can require a longer time for monitoring the data flow (receiver signals).

In particular for optimized power of a detector Det, both approaches can also be combined, i.e. an SPI sampling technique for efficient decoding that produces a lower CPU load combined with data sampling (data edge sampling) for precise data rate detection.

The sensitivity of the overall system can be increased by an optional RF LNA amplifier in front of the detector Det. An IF filter is not needed for pure demodulation, but can increase the robustness to interference.

Figure 4:
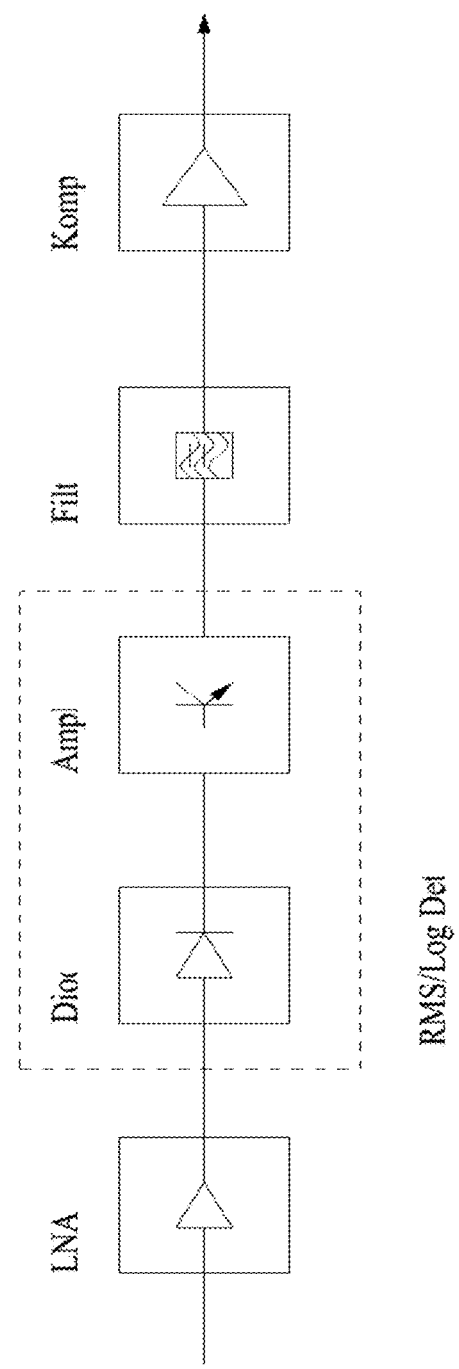
FIG. 4 shows elements of a detector (e.g. of a module comprising a "C2X" and/or "Car2Car" module part) comprising an integral RMS/log detector.

FIG. 4 shows, as another alternative embodiment of the invention, use of an integrated component (shown dashed) which combines some or all of the elements in the chain. An RMS and/or logarithmic detector, shown in FIG. 4, having sufficient bandwidth can be used in order to combine a diode with an amplifier.

All the other components can be optional components; a detector of this type can be combined with a microcontroller (for which an internal ADC would be used, if applicable).

The microcontroller itself can comprise software for frame detection or for detecting aforementioned properties of incoming signals. The frame detection or detection of aforementioned properties of incoming signals can proceed e.g. as specified above.

An important aspect and/or advantage of embodiments of the invention can lie in a DSRC detector for C2C communication. A DSRC detector can comprise e.g. only components for a receive path and/or RX path. Standard DSRC ASICs having full Tx and Rx path do not need to be used. A receive path can be sufficient for the evaluator uP.

If e.g. "DSRC" communication (=e.g. "Dedicated Short Range Communication") from any additional nodes (such as e.g. WT1, WT2 in FIG. 5) is detected using a detector Det in a frequency band intended for "C2X" communication and/or "Car2Car" communication, different responses could be made: e.g. this detection can be flagged as e.g. potential interference, and/or for transmission by a module for "C2X" communication and/or "Car2Car" communication in the vehicle, this module could transmit with more power and/or retransmit, or ask another transmitting vehicle to retransmit and/or transmit with more power and/or to transmit using a different transmission technique, etc.

The invention claimed is:

1. A method for detecting a Dedicated Short Range Communication (DSRC) signal in a motor vehicle, the motor vehicle comprising a module, the module comprising at least one of a communication between a vehicle and at least one of other vehicles and infrastructure (C2X) communications system and a communication between vehicles (Car2Car) communications system of the motor vehicle, the method comprising:
   receiving a signal,
   amplitude demodulating the signal,
   after amplitude demodulation of the received signal examining at least one property of the received signal by a protocol detector, wherein the protocol detector is a microcontroller; and
   wherein the at least one property being examined comprises a data rate wherein the data rate is an average data rate and at least one of
   a preamble of the signal,
   a frame length of the signal,
   a bit sequence at start of the signal,
   a bit sequence at end of the signal, and
   a checksum of the signal.

2. The method as claimed in claim 1, wherein the at least one property of the received signal is examined by the protocol detector after sampling.

3. The method as claimed in claim 1, wherein the received signal is oversampled.

4. A device for detecting a Dedicated Short Range Communication (DSRC) signal in a motor vehicle comprising:
   an in-vehicle device configured to amplitude demodulate a received signal, and
   a protocol detector configured to examine at least one property of a received signal;
   wherein the at least one property being examined comprises a data rate wherein the data rate is an average data rate and at least one of
   a preamble of the signal,
   a frame length of the signal,
   a bit sequence at the start of the signal,
   a bit sequence at the end of the signal, and
   a checksum of the signal; and
   wherein the at least one property of the received signal is examined by the protocol detector, and wherein the protocol detector is a microcontroller.

5. The device as claimed in claim 4, wherein the device is comprised in a module comprising at least one of a communication between a vehicle and at least one of other vehicles and infrastructure (C2X) communication system and a communication between vehicles (Car2Car) communication system of the motor vehicle.

6. The device as claimed in claim 4 further comprising: a splitter connected after an antenna, the splitter configured to guide the received signals to at least one of a C2X communication system and a Car2Car communication system of the motor vehicle, and further configured to guide said signals to the protocol detector configured to detect the properties.

7. The device as claimed in claim 4 further comprising: a receiver connected in front of the in-vehicle device for amplitude demodulation.

* * * * *